May 26, 1964     N. N. HOCHGRAF     3,134,726
PROPYLENE PURIFICATION PROCESS
Filed June 26, 1961
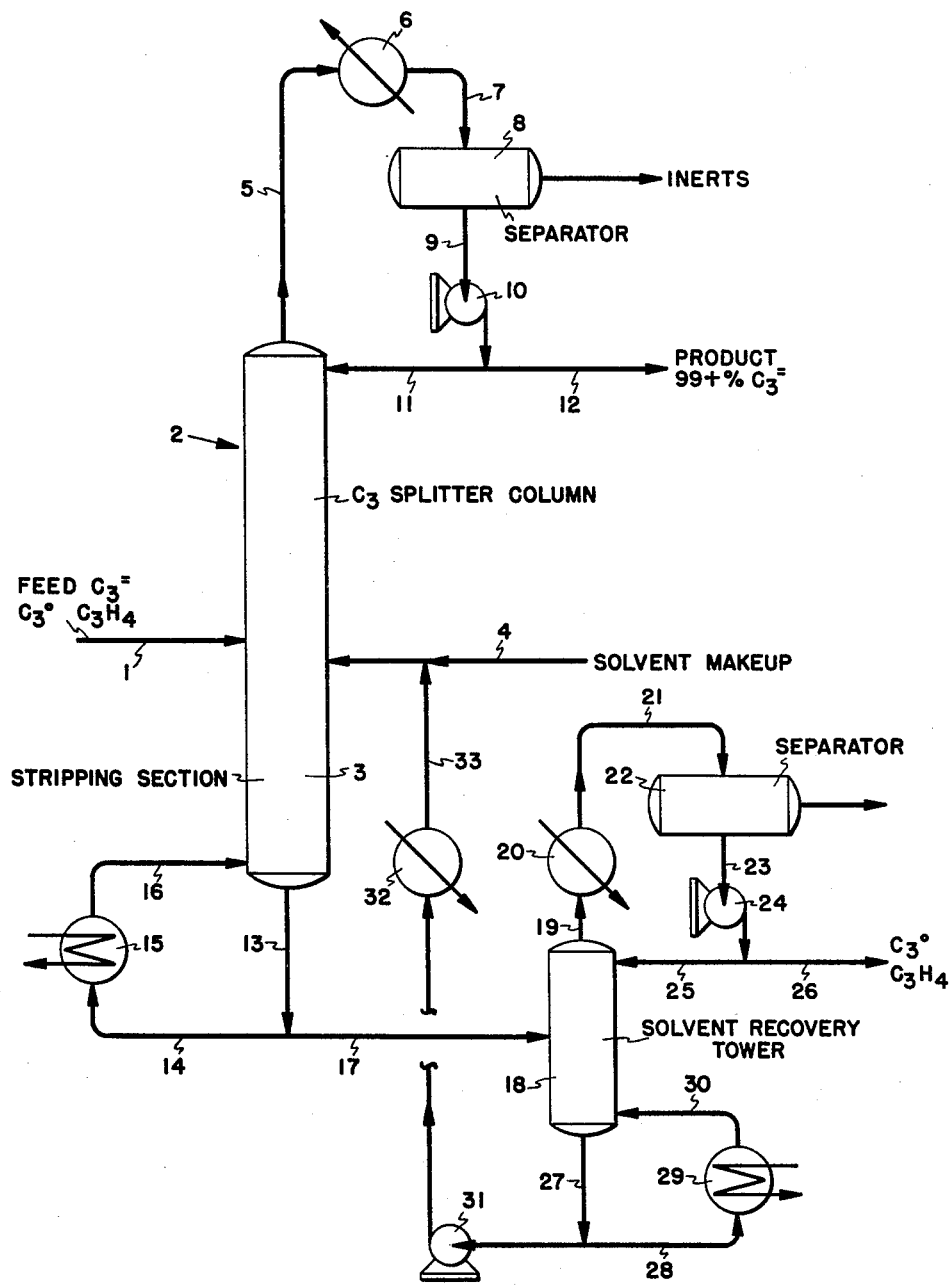
Norman N. Hochgraf INVENTOR
BY *Frank A. Dimock*
PATENT ATTORNEY

United States Patent Office 3,134,726
Patented May 26, 1964

3,134,726
PROPYLENE PURIFICATION PROCESS
Norman N. Hochgraf, Millington, N.J., assignor to Esso Research and Engineering Company, a corporation of Delaware
Filed June 26, 1961, Ser. No. 119,616
8 Claims. (Cl. 202—39.5)

The present invention relates to an improved process for separating highly pure propylene from a $C_3$ stream containing propylene, propane, propadiene, and methylacetylene. More particularly, this invention relates to an improved method for removing small amounts of methylacetylene and propadiene while simultaneously accomplishing the enrichment and recovery of propylene from the normally concomitant propane.

Most particularly, this invention relates to introducing a relatively non-volatile solvent near or below the feed plate in a propylene-propane splitter fractionator to decrease the volatility of these $C_3H_4$ contaminants relative to propylene in only the stripping section of the tower. Thus, removal of substantially all of these contaminants as bottoms from the column with propane is obtained.

The $C_3H_4$ materials are highly undesirable as contaminants in propylene to be used for many processes; for instance, catalytic oxidation to propylene oxide, polymerization to high molecular weight plastics and elastomers, etc. In most cases, a propylene purity well in excess of 95%, sometimes as high as 99.8%, is desired with the remainder being almost solely propane. Usually, total $C_3H_4$ contents of less than 0.01%, sometimes as low as 0.002%, are specified. The production of such high purity propylene is a costly operation because the differences in boiling point between the various constituents are slight and the degree of separation to be attained is great.

Prior art schemes for purifying propylene have only attacked a portion of the problem or have required several costly steps. While simple distillation is capable of making the very difficult separation of propylene and propane to any degree desired, the lower vapor pressure $C_3H_4$ contaminants are exceedingly difficult to remove simultaneously if high propylene recovery is to be achieved. This is because various non-ideal effects lead to azetrope formation of one or more of the $C_3H_4$'s with propane when very little propylene is present. Thus, recourse must be taken to more complex methods.

Selective hydrogenation of the $C_3H_4$ contaminants may be employed in combination with simple fractionation. Although selective hydrogenation of methylacetylene and propadiene has proved operable and capable of producing the desired product purity when combined with simple fractionation, this process suffers from several disadvantages (1) Usually some propylene is degraded to propane.
(2) Careful control of catalyst activity so as to obtain the desired selective removal of only the $C_3H_4$ contaminants is important since the level of sulfur and other contaminants in the feed affects said activity.
(3) Costs for equipment, catalyst and operation are considerable.
(4) Since the impurities present in the hydrogen and any hydrogen not reacted must be removed from the final propylene product, special emphasis must be placed on the purity of the hydrogen used.

Various separation schemes employing solvents in extractive distillation have been proposed. Sufficient quantities of a polar solvent may be used to reverse the normal volatility relationships between propylene and propane to allow propane to be taken overhead (Wayo et al. U.S. Patent 2,588,063 and Teter et al. U.S. Patent 2,588,056). Unfortunately, in these processes the $C_3H_4$'s tend to be extracted with the propylene into the solvent. A further, difficult separation is required to free the propylene from $C_3H_4$'s. Such a separation has been described (Schmitt et al. Canadian Patent 602,893). Although $C_3H_4$'s were removed, loss of propylene purity with respect to propane was experienced. All of the extractive distillation processes in which a volatility reversal is achieved suffer from the disadvantage that the low molecular weight of $C_3$ hydrocarbons requires very large weight rates of solvent to achieve the 60–90 mole percent solvent usually required to attain a suitable reversal of volatilities.

According to the present invention it has now been discovered that an extractive solvent may be introduced near or below the feed plate in a distillation tower while the enriching or upper section of said tower is operated largely in absence of said solvent. By this means propylene is obtained overhead in high purity while propane, $C_3H_4$'s and the solvent are removed together from the bottom of the tower. The $C_3$'s leaving the bottom are easily separated from the solvent which may be returned to the main tower for reuse. Thus, in the upper, or enriching, section of the tower ordinary distillation is used to separate propylene from propane utilizing the normal difference in relative volatility to effect the rejection of the $C_3H_4$ contaminants from the overhead propylene stream. In the lower, or stripping, section of the tower the extractive solvent has been found to decrease the volatility of the $C_3H_4$'s relative to propane much more than the volatility of propylene relative to propane is decreased. Thus, with the choice of the proper quantity of solvent a sufficient volatility can be maintained to allow high recovery of propylene while obtaining substantially complete removal of the $C_3H_4$'s with the propane.

Thus, in summary, prior art extractive distillation schemes have been presented teaching the benefits of use of large quantities of extractive solvent introduced near the top of the tower. However, in the present invention the use of relatively minor amounts of solvent introduced in the vicinity of the feed plate has been found to produce surprisingly high purities of propylene economically. The disadvantages incurred by use of prior art processes employing major quantities of solvent have been discussed above. If minor quantities of solvent are added near the top of the column, the rejection of propane from propylene becomes excedingly difficult, if not impossible. Thus, the present invention represents an optimum combination which yields the desried product in the most efficient manner.

The present invention will be more clearly understood from a consideration of the accompanying figure. The figure is a diagrammatic representation of the flow plan deemed suitable for practice of this invention. It is to be understood that other methods of solvent recovery than that shown may be practiced and that the particular method of recovery shown is not to be construed as a limitation to this invention.

Propylene-bearing feed may be obtained from a number of sources. One of the most common, having a relatively high content of $C_3H_4$'s, results from high temperature thermal cracking preferably steam cracking of various $C_3$ and heavier hydrocarbon gases and liquids. Such a feed stream may contain, for example, the following components:

|  | Range | Specifically |
|---|---|---|
| Propylene | 80–95 | 93.0 |
| Propane | 5–20 | 6.0 |
| Methylacetylene | 0.1–2 | 0.5 |
| Propadiene | 0.1–2 | 0.5 |

Turning now to the figure, feed is supplied through line 1 to the feed plate located in the center section of column 2. Below a point in the column about 10% of the total number of plates in the column above the feed plate, preferably at about the feed plate or at the top of the stripping section 3 of the column a solvent is supplied through line 4 and line 33. Suitable solvents are in general organic materials having a polarity greater than any of the hydrocarbons in the feed stream. This solvent is therefore relatively less volatile than these hydrocarbons. Thus, for example, solvents such as alcohols, ketones, nitriles, etc., may be used. The lower molecular weight members of these classes; namely methanol, ethanol, isopropanol, acetone, acetonitrile are especially preferred. The amount of solvent based on hydrocarbon liquid flowing down the column will depend on the solvent and conditions of operation chosen. However, the amount of solvent will usually range from 1.0 to 50.0 vol. percent, preferably 5.0 to 30.0 vol. percent, e.g. 15 vol. percent based on the $C_3$ feed stream. From the top of the column an overhead stream of highly pure propylene is passed through line 5 to conventional distillation overhead equipment consisting of condenser 6, line 7, accumulator 8, line 9 and pump 10. A portion of the effluent from pump 10 is returned as reflux to the column through line 11. The remainder being product propylene leaves the system through line 12. From the bottom of the column, a bottoms stream of propane, $C_3H_4$ contaminants and solvent is passed through line 13. A part of said stream is returned through line 14, reboiler 15 and line 16 to the column and the remainder is passed through line 17 to a solvent recovery tower 18. In the solvent recovery tower, propane and $C_3H_4$ contaminants are taken overhead and passed through line 19 to conventional overhead recovery equipment consisting of condenser 20, line 21, accumulator 22, line 23 and pump 24. A portion of the effluent from the pump is returned to the column as reflux through line 25, the remainder being drawn off through line 26 and disposed of in some suitable manner.

Solvent is recovered as bottoms through line 27, part of said stream being returned to the column through line 28, reboiler 29 and line 30 and the remainder being passed back to pump 31 and cooler 32 through line 33 to the column, any solvent makeup necessary being supplied through line 4.

EXAMPLE

Turning now to Table I, relative volatility data were obtained for the propane propylene, propadiene, methyl acetylene system. These data were obtained in a multi-stage vapor-liquid equilibrium still. The ratio of paraffin to olefin was kept roughly constant with the highly unsaturated $C_3H_4$'s present only in small amounts (0-2%). The volume percent polar solvent (acetone in this case) was varied widely.

*Table I*

LIQUID COMPOSITION, VOL. PERCENT

| Propane | 75 | 12 | 4 |
|---|---|---|---|
| Propylene | 25 | 35 | 11 |
| Propadiene | trace | trace | trace |
| Methylacetylene | trace | trace | trace |
| Acetone | 0 | 46 | 81 |

RELATIVE VOLATILITY $\alpha$ (COMPONENT/PROPANE) AT 90° F.

| Propane | 1.00 | 1.00 | 1.00 |
|---|---|---|---|
| Propylene | 1.13 | 0.935 | |
| Propadiene | 0.91 | 0.645 | 0.37 |
| Methylacetylene | 0.95 | 0.531 | 0.185 |

The basic data presented in Table I exhibited the unexpected effect; namely, that the presence of a polar solvent has a large effect on the relative volatilities of the $C_3H_4$ compounds as compared to the effect upon propylene and propane. In addition, as shown here, some volatilities are even reversed. The presence of 46 vol. percent acetone has made propylene somewhat less volatile than propane ($\alpha=0.935$) whereas, with no solvent present, propylene is naturally more volatile than propane.

These data, when interpolated in the low range of solvent concentrations (see Table II) illustrate the benefit achieved in propylene purification by practice of this invention.

*Table II*

VOLATILITIES (@ 90° F.) RELATIVE TO PROPANE

| | (1) | (2) | (3) | (4) | (5) | (6) |
|---|---|---|---|---|---|---|
| Acetone Present, Wt. Percent | 0.0 | | 10.0 | | 20.0 | |
| Location in Column | Top | Bottom | Top | Bottom | Top | Bottom |
| Propylene | 1.10 | 1.20 | 1.05 | 1.14 | 1.00 | 1.03 |
| Propane | 1.00 | 1.00 | 1.00 | 1.00 | 1.00 | 1.00 |
| Propadiene | 0.88 | 1.05 | 0.81 | 0.96 | 0.74 | 0.86 |
| Methylacetylene | 0.90 | 1.24 | 0.78 | 1.05 | 0.66 | 0.88 |

Several situations have been analyzed to make this advantage clear. Six columns of relative volatility values are presented covering three levels of solvent concentration (0, 10, 20 vol. percent). For each solvent concentration volatility data are given for relatively pure propylene and propane hydrocarbon contents. These two concentration conditions are encountered whenever high purity propylene is obtained in relatively high recovery. Thus, these two conditions represent the top and bottom respectively of a separation column.

It is seen from columns 1 and 2 that, if no solvent is present, contaminants including propane, can be rejected from the propylene in the top of the column. Unfortunately, due to non-ideal effects the propylene cannot be recovered fully from the propane in the bottom of such a column without simultaneously recovering methylacetylene. This situation makes it extremely difficult, if not impossible, to obtain high purity, methylacetylene-free propylene in high recovery. Addition of 20 vol. percent solvent (columns 5 and 6) makes recovery of propylene without methylacetylene in the bottom of the column relatively easy. However, use of prior art techniques employing solvent throughout the column makes rejection of propane from the propylene impossible in the upper section of the column. Columns 3 and 4 show an intermediate solvent concentration. In this case, it is evident that use of prior art techniques of extractive distillation would allow only extremely difficult separations in both the top and bottom sections of a tower. These separations would be so difficult as to be quite unsatisfactory.

The discovery that solvent is advantageously added in a restricted zone in the column is contrary to the teachings of the prior art. However, practice of the present invention allows operation in the top of a column in a fashion approximating that of column 1 in Table II. Addition of solvent near the feed causes the bottom of the column to operate in a fashion similar to columns 4 or 6 depending on the solvent concentration deemed to be optimum for the particular solvent and contaminants to be removed.

For the particular example, the optimum solvent concentration will be seen to lie between 10 and 20 wt. percent solvent and preferably closer to 10% so that the volatility of propylene is not reduced too much.

In the present invention the distillation operation will preferably be conducted in a tower having the following limits as to plates and reflux ratios:

Minimum theoretical plates (total reflux) _____ 25–150
Minimum reflux (infinite plates) _____ 5–20

This is true at 90° F. At lower temperatures fewer plates and less reflux will be required to do any given job. At higher temperatures the reverse is of course true. As a specific example a tower having 75 plates and 10:1 reflux ratio may be used. The distillation temperatures will preferably be in the range of −50 to 150° F., e.g. 90° F.

It is to be understood that this invention is not limited to the specifice example, which has been offered merely as an illustration, and that modifications may be made without departing from the spirit of this invention.

What is claimed is:

1. An improved process for separating highly pure propylene from a $C_3$ stream containing mainly propylene and propane and also small amounts of methyl acetylene and propadiene which comprises passing the said $C_3$ stream to a feed plate located in the center section of a distillation column, introducing from 1.0 to 50.0 vol. percent based on the $C_3$ feed stream of a solvent less volatile than the components in the said $C_3$ stream selected from the group consisting of lower molecular weight alcohols, ketones and nitriles below a point in the column about 10% of the total number of plates in the column above the feed plate, whereby the upper portion of said distillation column is operated largely in the absence of said solvent as a propylene enriching section with passage overhead from the column of highly pure propylene essentially free from methyl acetylene and propadiene and withdrawing a bottoms stream from the column containing the solvent and the rejected hydrocarbon components of the feed.

2. The process of claim 1 in which the solvent supplied to the column is ethyl alcohol.

3. The process of claim 1 in which the solvent supplied to the column is acetone.

4. The process of claim 1 in which the solvent supplied to the column is acetonitrile.

5. The process of claim 1 in which 5 to 30 mol percent of solvent based on the $C_3$ feed stream is supplied to the column.

6. The process of claim 1 in which a bottom stream is passed from the column to a solvent recovery tower, propane, methyl acetylene and propadiene are passed overhead from the solvent recovery tower and solvent is recycled from said solvent recovery tower to the column.

7. The process of claim 1 in which the distillation column is operated at temperatures in the range of −50 to 150° F. and in which the degree of fractionation is such that 25 to 150 minimum theoretical plates at total reflux and 5:1 to 20:1 minimum reflux ratios for an infinite number of plates are used.

8. The process of claim 1 in which the solvent is introduced at about the feed plate in the column.

References Cited in the file of this patent

UNITED STATES PATENTS

| | | |
|---|---|---|
| 2,371,342 | Mayfield | Mar. 13, 1945 |
| 2,779,458 | Nelson | Jan. 29, 1957 |
| 2,839,452 | Nelson | June 17, 1958 |

FOREIGN PATENTS

| | | |
|---|---|---|
| 567,199 | Belgium | May 14, 1958 |